US007765923B1

(12) United States Patent
Leyva et al.

(10) Patent No.: US 7,765,923 B1
(45) Date of Patent: Aug. 3, 2010

(54) MOTORIZED PRESS DEVICE FOR REPLACING OR REPAIRING TRANSMISSION PARTS

(76) Inventors: Hugo Oswaldo C. Leyva, 3411 W. Colfax Ave., Denver, CO (US) 30204; Jesus S. Ibarra, 6894 Gray Cir., Arvada, CO (US) 80003

( * ) Notice: Subject to any disclaimer, the term of this patent is extended or adjusted under 35 U.S.C. 154(b) by 0 days.

(21) Appl. No.: 12/427,325

(22) Filed: Apr. 21, 2009

(51) Int. Cl.
*B30B 1/14* (2006.01)
*B30B 15/04* (2006.01)
*B23P 19/04* (2006.01)

(52) U.S. Cl. ......................... 100/287; 100/247; 29/251; 29/256; 29/281.5

(58) Field of Classification Search ................. 100/103, 100/214, 226, 247, 257, 287; 72/447, 454, 72/455; 29/251, 256, 281.5; 269/290, 309, 269/312
See application file for complete search history.

(56) References Cited

U.S. PATENT DOCUMENTS 2,439,725 A 4/1948 Frost
3,442,111 A * 5/1969 Ledford et al. ............. 72/389.7
4,283,825 A * 8/1981 McKay et al. ................ 29/251
4,676,090 A 6/1987 Nishimura et al.
4,773,141 A 9/1988 Seredich
D336,093 S 6/1993 Saito et al.
5,983,475 A 11/1999 Umling
6,085,570 A * 7/2000 Preaus ....................... 72/389.7
6,553,903 B2 4/2003 Hawkins
6,829,541 B2 12/2004 Rydzewski
7,302,824 B1 12/2007 Buckler et al.
2007/0157764 A1 7/2007 Williams
2008/0006160 A1 * 1/2008 Al-Awadhi et al. .......... 100/280

* cited by examiner

*Primary Examiner*—Jimmy T Nguyen

(57) ABSTRACT

A motorized press device comprising a housing; a first and second vertical bar extending from the bottom through the top of the housing; a horizontal bar that connects the tops of the vertical bars; a first and second pressure arm extending downwardly from the horizontal bar; a pressure ring attached to the pressure arms; an electrical jack on the bottom of the housing that can expand upwardly; a shaft support tube attached to the electrical jack adapted to receive a transmission shaft, when the electrical jack is expanded the transmission shaft traverses the top of the housing through a shaft opening; wherein the electrical jack pushes the transmission shaft and drum up against the pressure ring which causes the pressure ring to compress the return spring.

4 Claims, 5 Drawing Sheets

MOTORIZED PRESS DEVICE FOR REPLACING OR REPAIRING TRANSMISSION PARTS

FIELD OF THE INVENTION

The present invention is directed to a motorized press device, more particularly to a press device for allowing an auto mechanic to replace or repair parts of a transmission such as piston seals and/or drums.

BACKGROUND OF THE INVENTION

Current methods of replacing transmission parts can be extremely challenging. Not only do some of the methods require a great deal of physical strength, but they can also require a significant amount of time. Injuries can also occur. The present invention features a motorized press device for replacing or repairing transmission parts. It is believed that the motorized press device of the present invention can help save time and energy, as well as help prevent injuries.

Any feature or combination of features described herein are included within the scope of the present invention provided that the features included in any such combination are not mutually inconsistent as will be apparent from the context, this specification, and the knowledge of one of ordinary skill, in the art. Additional advantages and aspects of the present invention are apparent in the following detailed description and claims.

DESCRIPTION OF PREFERRED EMBODIMENTS

Figure 1:
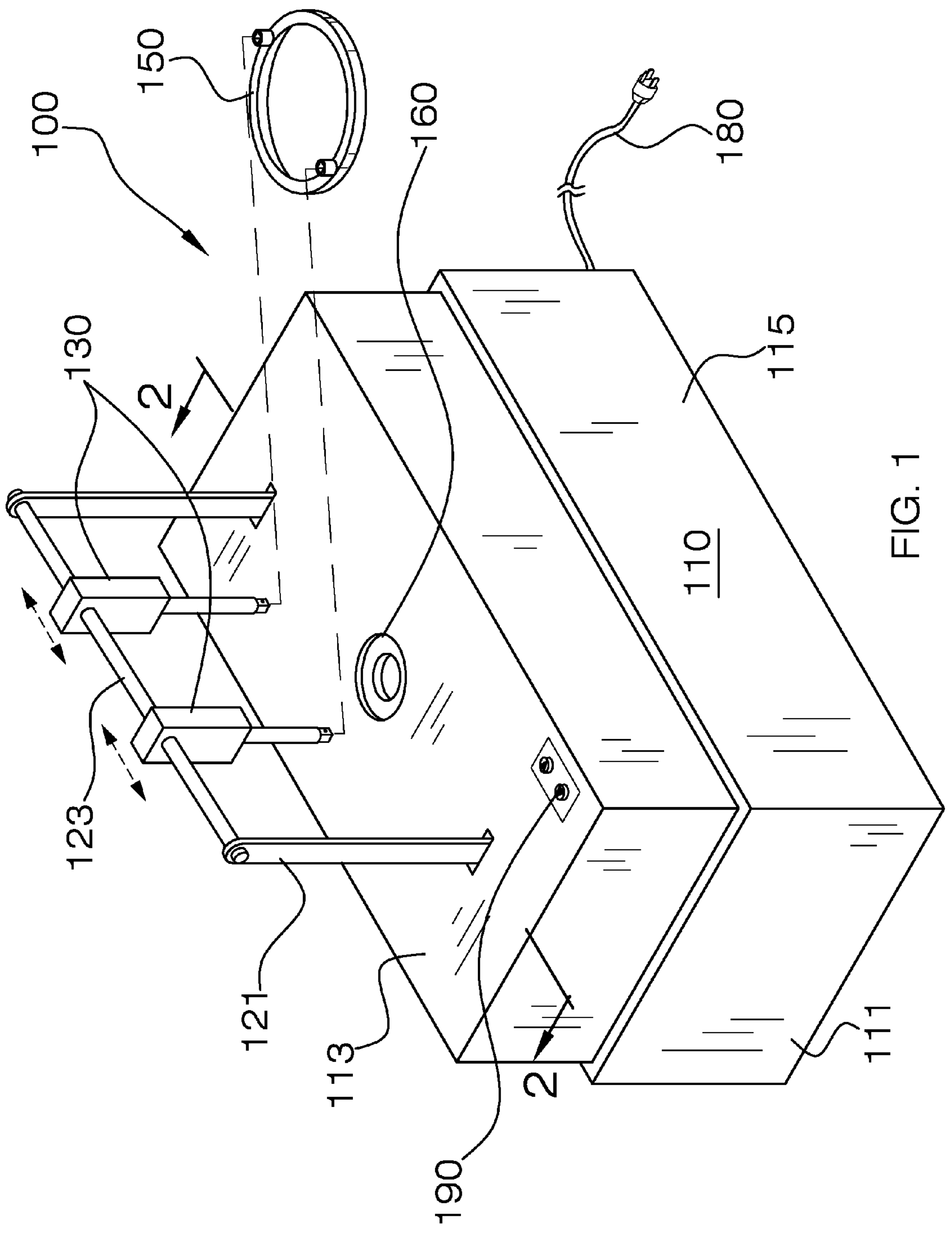
FIG. 1 is a perspective view of the press device of the present invention.

The following is a listing of numbers corresponding to a particular element refer to herein:

100 press device
110 housing
111 first side panel of housing
112 second side panel of housing
113 top panel of housing
114 bottom panel of housing
115 front panel of housing
116 back panel of housing
120 support frame
121 first vertical bar
122 second vertical bar
123 horizontal bar
124 low bar
130 arm holder
141 first pressure arm
142 second pressure arm
150 pressure ring
160 shaft opening
180 power cord

190 control button
205 drum
206 transmission shaft
220 electrical transducer box
250 motor and gear box
260 shaft support tube
270 electrical jack Referring now to FIGS. 1-5, the present invention features a motorized press device 100 for replacing or repairing transmission parts (e.g., piston seals, drums). The press device 100 of the present invention may allow a user (e.g., an auto mechanic) to perform transmission repairs in a safe and timely manner as compared to conventional methods. The press device 100 of the present invention can compress a return spring so that a snap ring can be replaced.

The press device 100 comprises a housing 110. The housing may have a first side panel 111, a second side panel 112, a top panel 113, a bottom panel 114, a front panel 115, and a back panel 116 (see FIG. 1). In some embodiments, the housing 110 is divided into a top half and a bottom half. The top half can slide up and down within the bottom half. In some embodiments, the housing 110 is generally rectangular.

The housing 110 may be constructed from a variety of materials and be constructed in a variety of sizes. For example, in some embodiments, the housing 110 is constructed from a material comprising a metal (e.g., steel). In some embodiments, the housing is between about 2 to 4 feet (e.g., about 3 feet) in height as measured from the top panel 113 to the bottom panel 114. In some embodiments, the housing 110 is between about 2 to 4 feet in length as measured from the first side panel 111 to the second side panel 112. In some embodiments the housing 110 is between about 1 to 3 feet in width as measured from the front panel 115 to the back panel 116.

Figure 2:
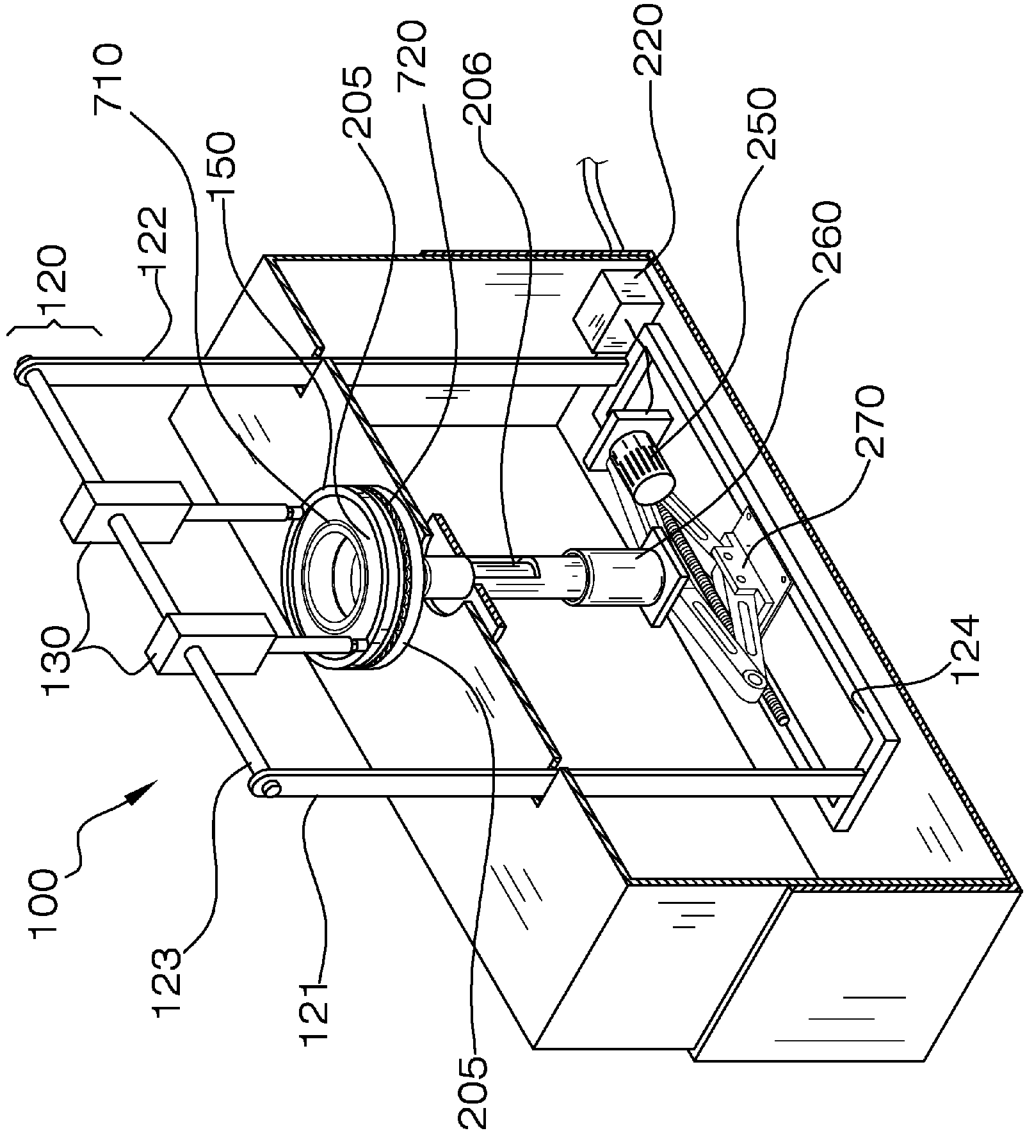
FIG. 2 is a perspective and cross sectional view of the press device of the present invention.
Figure 3:
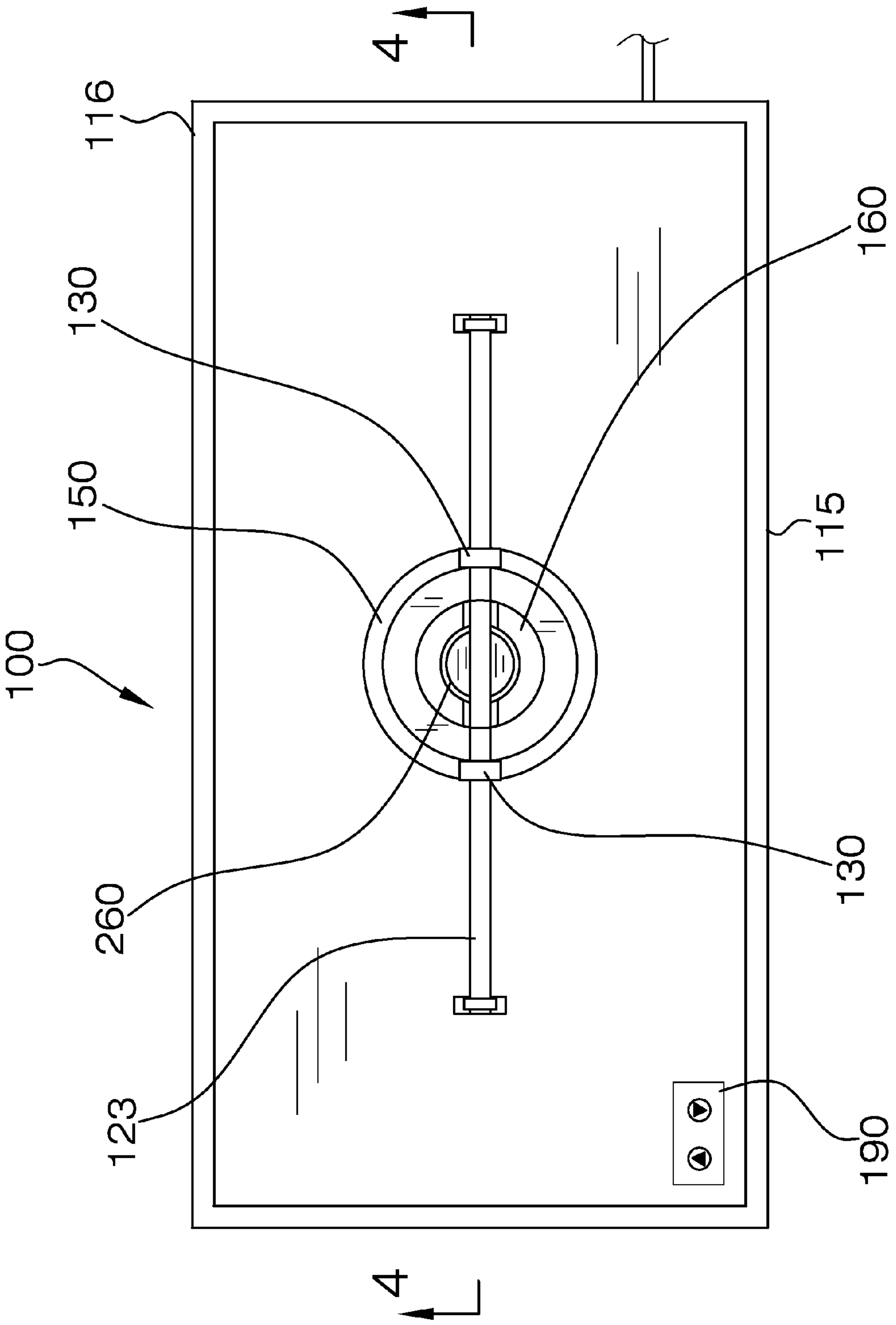
FIG. 3 is a top view of the press device of the present invention.
Figure 4:
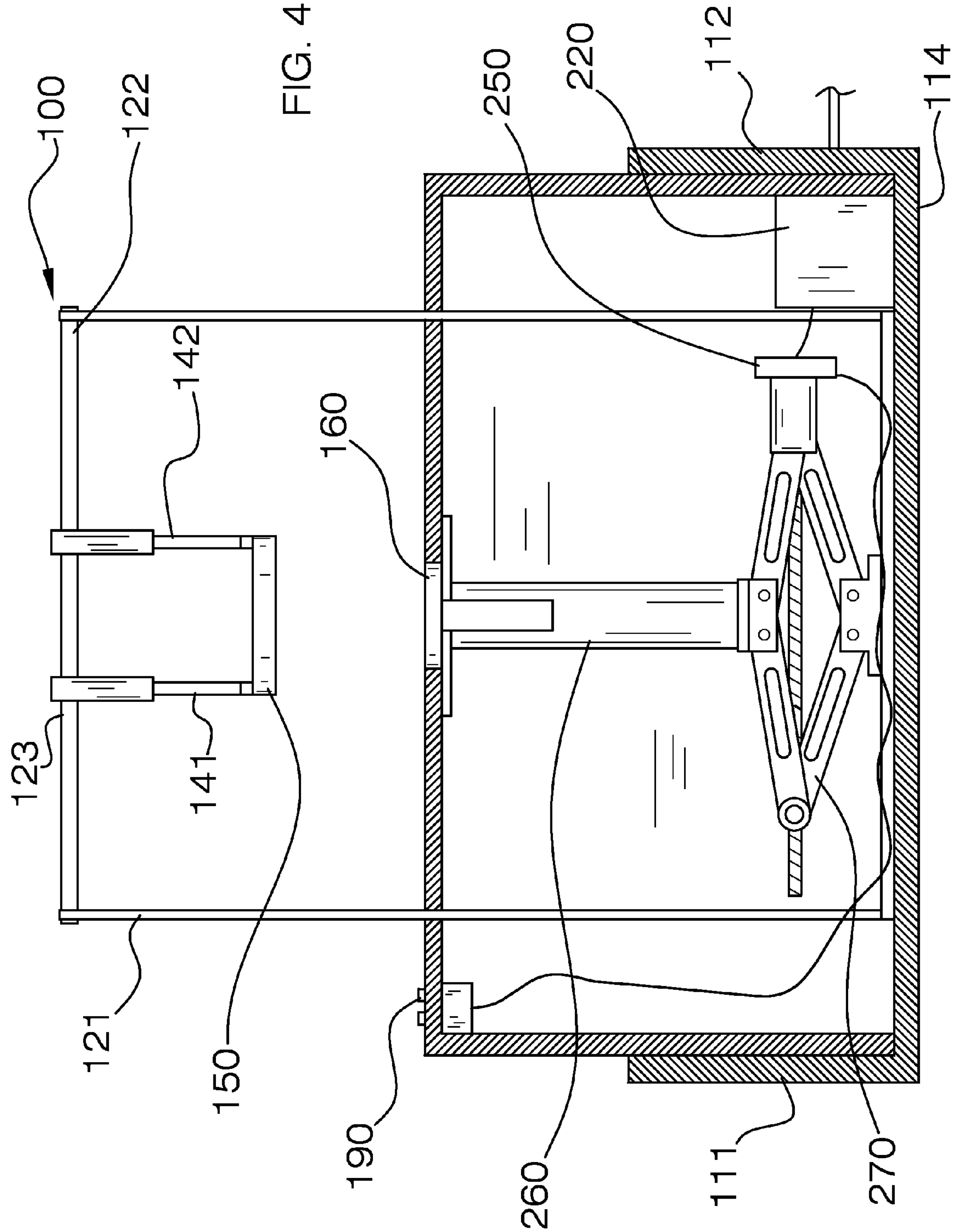
FIG. 4 is a side cross sectional view of the press device of the present invention.
Figure 5:
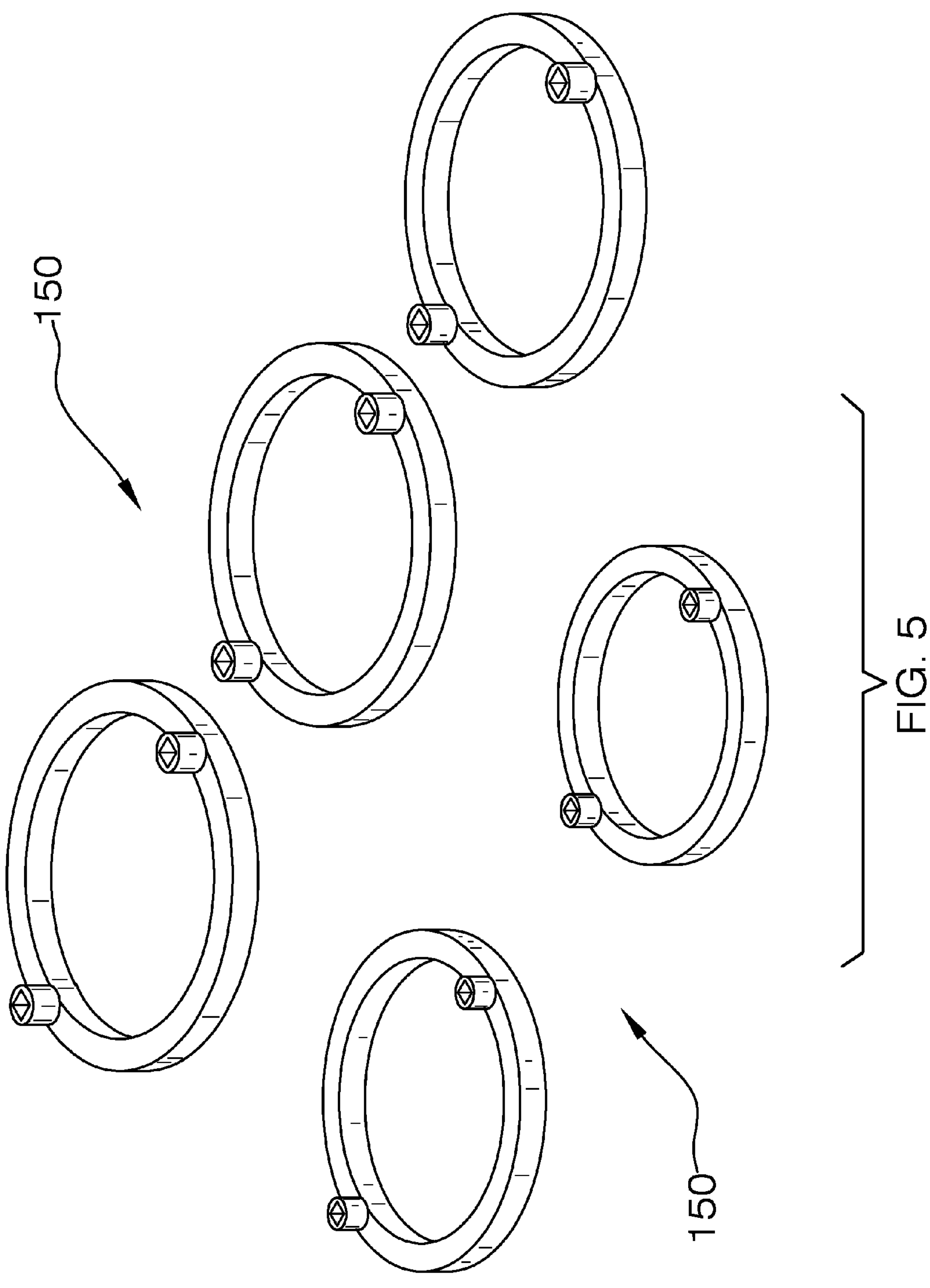
FIG. 5 is a perspective view of a plurality of pressure rings of the press device of the present invention.

Attached to the bottom panel 114 of the housing 110 and extending upwardly through the top panel 113 of the housing is a generally U-shaped support frame 120 that comprises a first vertical bar 121 and a second vertical bar 122 connected by a horizontal bar 123 (see FIG. 2). The horizontal bar 123 connects the top end of the first vertical bar 121 to the top end of the second vertical bar 122. The horizontal bar 123 is raised a certain height above the top panel 113 of the housing 110. In some embodiments, the horizontal bar 123 can rotate, for example the horizontal bar 123 is not rigidly attached to the first vertical bar 121 and the second vertical bar 122. In some embodiments, a low bar 124 connects the first vertical bar 121 and second vertical bar 122 inside the housing 110. The first vertical bar 121 and second vertical bar 122 are generally parallel to one another.

Extending downwardly from the horizontal bar 123 toward the top panel 113 of the housing 110 is a first pressure arm 141 and a second pressure arm 142. The pressure arms each have a first end and a second end (e.g., bottom end), wherein the first end is attached to the horizontal bar via an arm holder 130. In some embodiments, the pressure arm can be screwed into the arm holder 130.

A pressure ring 150 is removably attached to the second ends (e.g., bottom ends) of the pressure arms. In some embodiments, the pressure ring 150 can be snapped onto the second ends of the pressure arms. The first pressure arm 141, second pressure arm 142, the first vertical support bar 121, second vertical support bar 122, the horizontal bar 123, and the pressure ring 150 are rigid so as to withstand pressure. The pressure ring 150 can be constructed in various sizes. The pressure ring 150 can be removed from the pressure arms and replaced with a different pressuring ring 150, for example a pressure ring 150 of a different size.

Inside the housing 110 and attached to the bottom panel 114 is an electrical jack 270. The electrical jack 270 is similar to standard electrical jacks, well known to one of ordinary skill in the art. The electrical jack 270 can be moved upward and downward via a motor and gear box 250 connected to the electrical jack 270 (see FIG. 2). The motor and gear box 250 allows for expansion of the electrical jack 270 upward so as to apply pressure where needed.

The press device 100 (e.g., motor and gear box 250, electrical jack 270) is electrically/operatively connected to a power source. In some embodiments, the power source is an electrical socket (e.g., 110 volt AC electrical source) and the press device 100 comprises a power cord 180. In some embodiments, the power source is a vehicle's power system (e.g., car battery, 12 volt electrical system). In some embodiments, the press device comprises a transducer box 220.

In some embodiments, a control button 190 is disposed on the housing 110 (e.g., the top panel 113 of the housing 110). The control button 190 may allow a user to turn the press device 100 on and off. The control button 190 is electrically/operatively connected to the power source.

Attached to the top of the electrical jack 270 is a shaft support tube 260. Disposed in the top panel 113 of the housing 110 and directly below the pressure ring 150 is a shaft opening 160. The shaft opening 160 is aligned with the shaft support tube 260. When the jack 270 is expanded upwardly, the shaft support tube 260 can pass through the top panel 113 of the housing 110 via the shaft opening 160.

The shaft support tube 260 is adapted for receiving a transmission shaft 206. In some embodiments, the transmission shaft 206 has a first end and second end, wherein the first end is inserted into the shaft support tube 260 and the second end extends upwardly through the shaft opening 160.

To use the press device 100, the transmission shaft 206 is inserted into the shaft support tube 260. The pressure ring 150 is aligned over the return spring 720 of the drum 205. The press device 100 is activated and the electrical jack 270 pushes the transmission shaft and drum 205 up against the pressure ring 150. As this motion continues, the pressure ring 150 compresses the return spring 720. When the return spring 720 is compressed, the snap ring 710 is revealed and can be removed and/or replaced.

In some embodiments, the press device 100 of the present invention is portable.

As used herein, the term "about" refers to plus or minus 10% of the referenced number. For example, an embodiment wherein the housing 100 is about 2 feet in width includes a housing 110 that is between 1.8 and 2.2 feet in width.

The following the disclosures of the following U.S. patents are incorporated in their entirety by reference herein: U.S. Pat. No. 6,553,903; U.S. Pat. No. 4,676,090; U.S. Pat. No. 2,439,725; U.S. Pat. No. 5,983,475; U.S. Pat. No. 4,773,141; U.S. Pat. No. 6,829,541; U.S. Pat. No. 7,302,824; U.S. Pat. Application No. 2007/0157764.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A motorized press device comprising:

(a) a housing divided into a top half that can slide up and down in a bottom half, wherein the housing has a bottom panel and a top panel;

(b) a first vertical bar and a second vertical bar that each extend from the bottom panel through the top panel of the housing, wherein the first vertical bar and second vertical bar are generally parallel to each other;

(c) a horizontal bar that connects a top end of the first vertical bar with a top end of the second vertical bar;

(d) a first pressure arm and a second pressure arm, each extending downwardly from the horizontal bar towards the top panel of the housing, wherein a pressure ring is removably attached to both a bottom end of the first pressure arm and a bottom end of the second pressure arm;

(e) an electrical jack disposed on the bottom panel of the housing, a motor and gear box operatively connected to the electrical jack allows for the expansion of the electrical jack upward toward the top panel of the housing; and (f) a shaft support tube attached to the electrical jack, the shaft support tube is adapted to receive a transmission shaft, when the electrical jack is expanded upwardly the transmission shaft traverses the top surface of the housing through a shaft opening;

wherein the pressure ring is aligned over a return spring of a drum of the transmission shaft, the electrical jack pushes the transmission shaft and drum up against the pressure ring which causes the pressure ring to compress the return spring so as to reveal a snap ring which can be removed or replaced.

2. The press device of claim 1, wherein the motor and gear box is operatively connected to a power source.

3. The press device of claim 1 further comprising a control button operatively connected to the motor and gear box for turning the press device on and off.

4. The press device of claim 1, wherein the press device is portable.

* * * * *